H. S. BLACKMORE.
CELL FOR ELECTROLYTIC OR OTHER PURPOSES.
APPLICATION FILED SEPT. 24, 1907.
922,079.
Patented May 18, 1909.
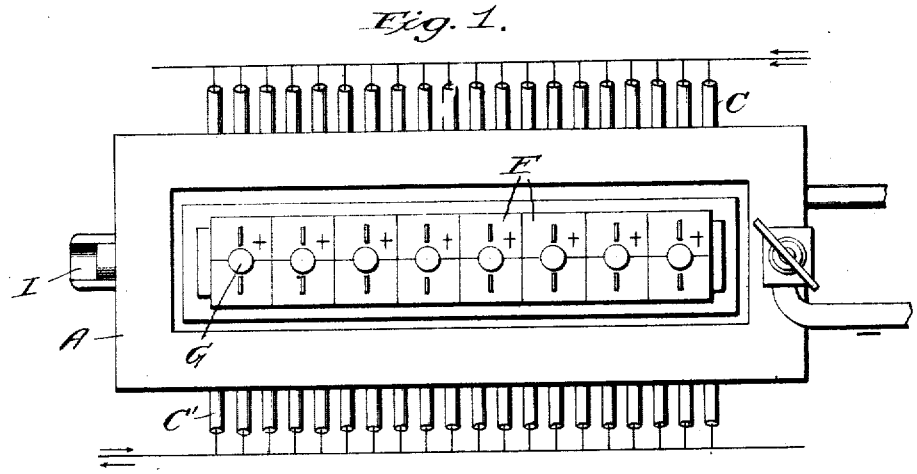
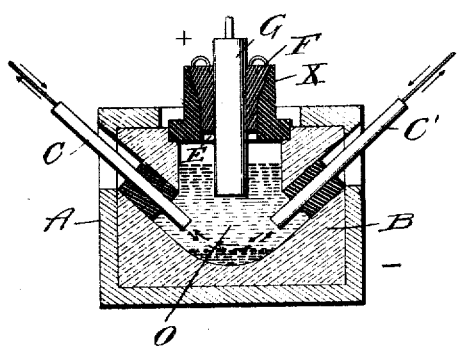
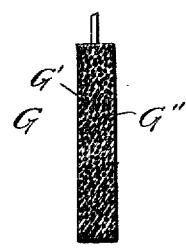
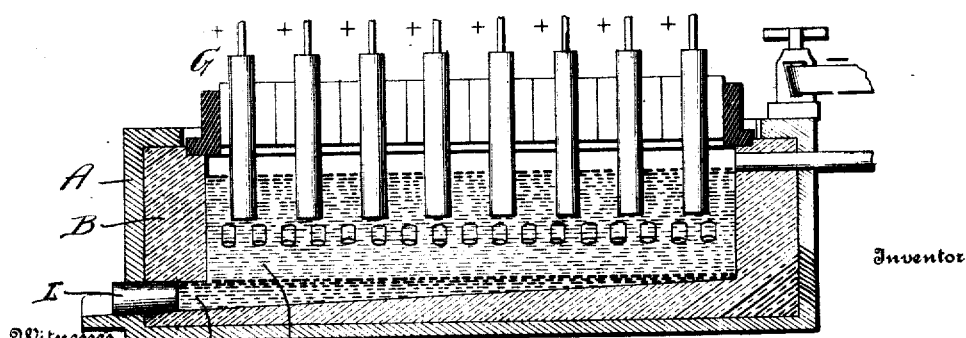

UNITED STATES PATENT OFFICE.

HENRY SPENCER BLACKMORE, OF MOUNT VERNON, NEW YORK.

CELL FOR ELECTROLYTIC OR OTHER PURPOSES.

No. 922,079.  Specification of Letters Patent.  Patented May 18, 1909.

Original application filed April 11, 1906, Serial No. 311,162. Divided and this application filed September 24, 1907. Serial No. 394,370.

*To all whom it may concern:*

Be it known that I, HENRY SPENCER BLACKMORE, a citizen of the United States, residing at Mount Vernon, in the county of Westchester and State of New York, have invented certain new and useful Improvements in Cells for Electrolytic or other Purposes, of which the following is a specification.

This invention relates to cells for electrochemical, metallurgical, or other purposes, and is particularly adaptable to the electrolysis of molten or other fluid electrolyte, and relates specifically to that class of electrolysis which includes the reduction of metals from their fluid salts or compounds; and it consists of a receptacle containing an electrolyte having in communication electrodes containing or comprising metal carbid, acetylid, or other metal-carbon-containing compound, together with a binder, such as carbon, the electrodes *per se,* however, being claimed in an application filed by me August 31, 1907, Serial No. 390,949 which application is a division of my original application filed April 18, 1903, Serial No. 153,329, the present application being a division of my application filed April 11, 1906, Serial No. 311,162, both applications being a division of the application filed April 18, 1903, Serial No. 153,329.

The present invention consists of a cell, preferably provided with a carbon or carbon lined receptacle adapted to act as an electrode, containing an electrolyte such as molten or liquefied metal salts or compounds communicating with which is an electrode comprising or containing a metal-carbon-compound, metal carbid, or acetylid, together with a binder, such as carbon, the said cell being provided with means whereby the electrolyte may be subjected to electrolytic action, and means whereby the electrolyte may be fused, liquefied, or maintained in a fluid condition while being subjected to electrolytic action.

As an illustration of a cell constructed in accordance with the present invention, I will take for example, one which is particularly applicable to the reduction of metals from their salts or compounds in a fused or liquefied condition by electrolytic or electrochemical action, the said cell being illustrated in the accompanying drawing in which—

Figure 1 is a top plan view of the apparatus; Fig. 2, a vertical transverse section; Fig. 3, a vertical longitudinal section, and Fig. 4 a longitudinal section of an electrode comprising a metal-carbon-containing compound and a binder.

Referring to the several views the letter A indicates a suitable box or receptacle, preferably of cast iron, lined with a conductive substance B, such as carbon, into which project the heating electrodes C, C', which pass through the insulators D, D'. The material is introduced into the apparatus through the openings E, which are closed by insulating-plugs F, passing into an insulating-cover X, and through which pass the electrodes G, which electrodes consist of a mixture of metal carbid, acetylid, or other metal-carbon-containing compound G', and a binder G'', preferably of electrically conductive nature, such as carbon, as shown in Fig. 4. The carbon-lined receptacle contains the fluid electrolyte O, which communicates with the composite electrode G.

As an illustration of the employment, specifically, of a cell provided with an electrode containing a metal-carbon compound, metal carbid, or acetylid, such as calcium carbid containing a fluid, liquid or liquefied electrolyte, I will take, for example, its application in connection with the reduction of metal from its compounds or salts by electrochemical action, such as the reduction of metal oxid or other compounds *per se,* or metal or metals combined with one or more electro-negative elements, either fused or liquefied individually, or in conjunction with other compounds or substances, which may facilitate the fusion or liquefaction, by dissolving or suspending the same in a state of fusion or solution; or more specifically its application in connection with the reduction of metal oxy-halid or oxy-fluorid compounds or compositions, such as may be formed by heating a mixture of metal fluorid and metal oxid, or more specifically aluminium fluorid and aluminium oxid, as described and claimed as to chemical reduction in Letters-Patent of the United States granted to me May 6, 1902, and numbered 699,282, in which is described the following reaction, viz:—

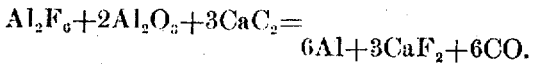
$$Al_2F_6 + 2Al_2O_3 + 3CaC_2 =$$
$$6Al + 3CaF_2 + 6CO.$$

The present application is intended to cover a cell provided with the aforesaid metal carbid or acetylid, (calcium carbid), together with a binder, in the form of an electrode which may be employed, in conjunction with an electric current, to augment the reduction of metals, as covered in the aforesaid Letters-Patent.

In the operation of a cell, as covered in the present application, in connection with the process as revealed and claimed in the U. S. Patent No. 699,282 aforementioned, I place in the receptacle A—B a quantity of calcium chlorid and fuse the same by passing an alternating electric current therethrough between the electrodes C, C'. I then add from time to time quantities of calcium chlorid until the interior of the apparatus has been sufficiently filled. I then add to the molten content a mixture of aluminium fluorid and aluminium oxid, and pass a direct or electrolytic current through the electrolyte O, between the composite electrode G and the carbon lining B, of receptacle A, which constitutes the cathode, whereupon a reducing action is set up between the carbid containing electrode G, such as calcium carbid, and the electro-negative constituents fluorin and oxygen of the aluminium fluorid and oxid supplied thereto. The fluorin combines with the calcium of the calcium carbid and the oxygen with the carbon thereof, at the same time separating metallic aluminium which accumulates in the bottom of the apparatus and is withdrawn from time to time through the tap-hole H, by removing the tap-hole plug 1. By supplying new anodes G and fresh aluminium oxid and fluorid, from time to time, withdrawing the metal reduced and the accumulating fluorids, the process may be carried on continuously while the materials are maintained in a molten condition, by means of the alternating electric current passing between the electrodes C, C'.

I do not desire to be understood as limiting myself to any specific form or construction of cell, but that various changes or modifications may be made in its form, shape, or arrangement, to adapt the same to the particular character of the substance to be acted upon, so long as the integrity of the combination of the members or elements of the cell is not destroyed, or their individual function or character departed from, the essential feature of the invention being that the cell is provided with electrodes comprising or containing metal-carbon-compound, carbid or acetylid in some form, together with a binder, preferably of electrically-conductive nature, such as carbon.

Electrodes comprising other carbids, acetylids, or metal-carbon-containing compounds, united or bound together with carbon or other binder, forming a composite electrode of the character aforementioned, instead of calcium carbid or acetylid, such as aluminium carbid, may be employed without departing from the spirit of my invention, and the term " metal carbid " as employed herein with reference to the character of a species of metal-carbon-containing compound content of the electrode, relates to carbid of electrically conductive nature or of comparatively low electrical resistance. Under metal carbids described and claimed herein, as a constituent of the composite electrode, is included double metal carbids or metal-hydrogen-containing compounds such as hydrogen and other metal carbid, or such compounds as may be considered as hydrogen carbid (hydrocarbon) in which one or more hydrogens are replaced by another metal, and the " acetylid " referred to and claimed herein includes that species of carbid which yields acetylene upon decomposition with water, and which compound may be considered as acetylene in which hydrogen thereof is replaced by other metal. Calcium carbid and a binder, the species of electrode described in the cell herein set forth, is a species of acetylid which is a species of carbid, metal carbid, a metal acetylid, and metal-carbon-containing compound, and may be considered as acetylene ($H_2C_2$) in which the two atoms of hydrogen are replaced by the dyad calcium.

The term " cell " is intended to include any form, or character, of apparatus provided with a receptacle, a composite electrode or electrodes, such as described, an opposite electrode which may also comprise a carbid and binder, and an intervening fluid-conductor, or other electrolyte, and that the cell may be employed for any electrical purpose to which it may be applicable, as well as the reduction of metals as herein specifically set forth; and, that the electrolyte may be fluid, or liquid, or liquefied, or heated, or fused or melted and maintained in a heated, fused, or molten condition, by means other than the electrolytic current, such as an alternating current, or can be heated, fused, or melted, and so maintained, by heat, applied or generated externally, or internally, as set forth in original application Serial No. 153,329, filed April 18, 1903, of which this application is a division.

The apparatus illustrated in the accompanying drawing is for the purpose of more clearly describing the process and is shown to more particularly identify the invention and differentiate the same from the prior art and is the same as intended for the purpose of the process as originally described except to certain features in reference to means for maintaining fusion of electrolyte, or electrolyte and vehicle therefor, which means were not specifically described and are not herein claimed but are merely illustrative of the process.

The term " metal-carbon-containing compound " employed herein is intended to imply and does imply a distinct chemical compound containing chemically combined elements, of which metal and carbon are essentials, and said expression is to be interpreted to the full extent and with the full meaning of the terms relating to such compounds as broadly set forth in the specification of the original application, filed April 18, 1903, Serial No. 153,329, of which the present application is a division, as before stated, as being "substances containing metal and carbon, either as carbid, acetylid, or other union," it being obvious that the said metal-carbon-containing compound employed as essential ingredient in the present composite electrode must be a conductor of electricity.

Having now described my invention, what I claim as new, and desire to secure by Letters-Patent, is—

1. A cell comprising the combination of a receptacle, an electrode comprising a carbid and a binder, an opposite electrode, and a body of electrolyte.

2. A cell comprising the combination of a receptacle, an electrode comprising a metal-carbon-containing compound and a binder, an opposite electrode, and a body of electrolyte.

3. A cell comprising the combination of a receptacle, an electrode comprising a metal-carbid and a binder, an opposite electrode, and a body of electrolyte.

4. A cell comprising the combination of a receptacle, an electrode comprising an acetylid and a binder, an opposite electrode, and a body of electrolyte.

5. A cell comprising the combination of a receptacle, an electrode comprising a metal acetylid and a binder, an opposite electrode, and a body of electrolyte.

6. A cell comprising the combination of a receptacle, an electrode comprising a carbid and a binder, an opposite electrode, and a body of fluid electrolyte.

7. A cell comprising a combination of a receptacle, an electrode comprising a metal-carbon-containing compound and a binder, an opposite electrode, and a body of fluid electrolyte.

8. A cell comprising a combination of a receptacle, an electrode comprising a metal carbid and a binder, an opposite electrode, and a body of fluid electrolyte.

9. A cell comprising a combination of a receptacle, an electrode comprising an acetylid and a binder, an opposite electrode, and a body of fluid electrolyte.

10. A cell comprising a combination of a receptacle, an electrode comprising a metal acetylid and a binder, an opposite electrode, and a body of fluid electrolyte.

11. A cell comprising a combination of a receptacle, an electrode comprising a carbid and a binder, an opposite electrode, and a body of liquefied electrolyte.

12. A cell comprising a combination of a receptacle, an electrode comprising a metal-carbon-containing compound and a binder, an opposite electrode, and a body of liquefied electrolyte.

13. A cell comprising a combination of a receptacle, an electrode comprising a metal carbid and a binder, an opposite electrode, and a body of liquefied electrolyte.

14. A cell comprising the combination of a receptacle, an electrode comprising an acetylid and a binder, an opposite electrode, and a body of liquefied electrolyte.

15. A cell comprising a combination of a receptacle, an electrode comprising a metal acetylid and a binder, an opposite electrode, and a body of liquefied electrolyte.

16. A cell comprising a combination of a receptacle, an electrode comprising a carbid and a binder, an opposite electrode, a body of liquefied electrolyte, and means for maintaining the electrolyte in a fluid condition.

17. A cell comprising a combination of a receptacle, an electrode comprising a metal-carbon-containing compound and a binder, an opposite electrode, a body of liquefied electrolyte, and means for maintaining the electrolyte in a fluid condition.

18. A cell comprising a combination of a receptacle, an electrode comprising a metal carbid and a binder, an opposite electrode, a body of liquefied electrolyte, and means for maintaining the electrolyte in a fluid condition.

19. A cell comprising the combination of a receptacle, an electrode comprising an acetylid and a binder, an opposite electrode, a body of liquefied electrolyte, and means for maintaining the electrolyte in a fluid condition.

20. A cell comprising a combination of a receptacle, an electrode comprising a metal acetylid and a binder, an opposite electrode, a body of liquefied electrolyte, and means for maintaining the electrolyte in a fluid condition.

21. A cell comprising a combination of a receptacle, an electrode comprising a carbid and a binder, an opposite electrode, and a body of heated electrolyte.

22. A cell comprising a combination of a receptacle, an electrode comprising a metal-carbon-containing compound and a binder, an opposite electrode, and a body of heated electrolyte.

23. A cell comprising a combination of a receptacle, an electrode comprising a metal carbid and a binder, an opposite electrode, and a body of heated electrolyte.

24. A cell comprising a combination of a receptacle, an electrode comprising an acetylid and a binder, an opposite electrode, and a body of heated electrolyte.

25. A cell comprising a combination of a receptacle, an electrode comprising a metal acetylid and a binder, an opposite electrode and a body of heated electrolyte.

26. A cell comprising a combination of a receptacle, an electrode comprising a carbid and a binder, an opposite electrode, a body of heated electrolyte, and means for maintaining the electrolyte in a heated condition.

27. A cell comprising a combination of a receptacle, an electrode comprising a metal-carbon-containing compound and a binder, an opposite electrode, a body of heated electrolyte, and means for maintaining the electrolyte in a heated condition.

28. A cell comprising a combination of a receptacle, an electrode comprising a metal carbid and a binder, an opposite electrode, a body of heated electrolyte, and means for maintaining the electrolyte in a heated condition.

29. A cell comprising a combination of a receptacle, an electrode comprising an acetylid and a binder, an opposite electrode, a body of heated electrolyte, and means for maintaining the electrolyte in a heated condition.

30. A cell comprising a combination of a receptacle, an electrode comprising a metal acetylid and a binder, an opposite electrode, a body of heated electrolyte, and means for maintaining the electrolyte in a heated condition.

31. A cell comprising a combination of a receptacle, an electrode comprising a carbid and a binder, an opposite electrode, and a body of molten electrolyte.

32. A cell comprising a combination of a receptacle, an electrode comprising a metal-carbon-containing compound and a binder, an opposite electrode, and a body of molten electrolyte.

33. A cell comprising a combination of a receptacle, an electrode comprising a metal carbid and a binder, an opposite electrode, and a body of molten electrolyte.

34. A cell comprising a combination of a receptacle, an electrode comprising an acetylid and a binder, an opposite electrode, and a body of molten electrolyte.

35. A cell comprising a combination of a receptacle, an electrode comprising a metal acetylid and a binder, an opposite electrode, and a body of molten electrolyte.

36. A cell comprising a combination of a receptacle, an electrode comprising a carbid and a binder, an opposite electrode, a body of molten electrolyte, and means for maintaining the electrolyte in a molten condition.

37. A cell comprising a combination of a receptacle, an electrode comprising a metal-carbon-containing compound and a binder, an opposite electrode, a body of molten electrolyte, and means for maintaining the electrolyte in a molten condition.

38. A cell comprising a combination of a receptacle, an electrode comprising a metal carbid and a binder, an opposite electrode, a body of molten electrolyte, and means for maintaining the electrolyte in a molten condition.

39. A cell comprising a combination of a receptacle, an electrode comprising an acetylid and a binder, an opposite electrode, a body of molten electrolyte, and means for maintaining the electrolyte in a molten condition.

40. A cell comprising a combination of a receptacle, an electrode comprising a metal acetylid and a binder, an opposite electrode, a body of molten electrolyte, and means for maintaining the electrolyte in a molten condition.

41. A cell comprising a combination of a receptacle, an electrode comprising a carbid and a carbon binder, an opposite electrode, and an intervening body of electrolyte.

42. A cell comprising a combination of a receptacle, an electrode comprising a metal-carbon-containing compound and a carbon binder, an opposite electrode, and an intervening body of electrolyte.

43. A cell comprising a combination of a receptacle, an electrode comprising a metal carbid and a carbon binder, an opposite electrode, and an intervening body of electrolyte.

44. A cell comprising a combination of a receptacle, an electrode comprising an acetylid and a carbon binder, an opposite electrode, and an intervening body of electrolyte.

45. A cell comprising a combination of a receptacle, an electrode comprising a metal acetylid and a carbon binder, an opposite electrode, and an intervening body of electrolyte.

46. A cell comprising a combination of a receptacle, an electrode comprising a carbid and a carbon binder, an opposite electrode, and an intervening body of fluid electrolyte.

47. A cell comprising a combination of a receptacle, an electrode comprising a metal-carbon-containing compound and a carbon binder, an opposite electrode, and an intervening body of fluid electrolyte.

48. A cell comprising a combination of a receptacle, an electrode comprising a metal carbid and a carbon binder, an opposite electrode, and an intervening body of fluid electrolyte.

49. A cell comprising a combination of a receptacle, an electrode comprising an acetylid and a carbon binder, an opposite electrode, and an intervening body of fluid electrolyte.

50. A cell comprising a combination of a receptacle, an electrode comprising a metal acetylid and a carbon binder, an opposite electrode, and an intervening body of fluid electrolyte.

51. A cell comprising a combination of a receptacle, an electrode comprising a carbid and a carbon binder, an opposite electrode, and an intervening body of liquefied electrolyte.

52. A cell comprising a combination of a receptacle, an electrode comprising a metal-carbon-containing compound and a carbon binder, an opposite electrode, and an intervening body of liquefied electrolyte.

53. A cell comprising a combination of a receptacle, an electrode comprising a metal carbid and a carbon binder, an opposite electrode, and an intervening body of liquefied electrolyte.

54. A cell comprising a combination of a receptacle, an electrode comprising an acetylid and a carbon binder, an opposite electrode and an intervening body of liquefied electrolyte.

55. A cell comprising a combination of a receptacle, an electrode comprising a metal acetylid and a carbon binder, an opposite electrode, and an intervening body of liquefied electrolyte.

56. A cell comprising a combination of a receptacle, an electrode comprising a carbid and a carbon binder, an opposite electrode, and an intervening body of heated electrolyte.

57. A cell comprising a combination of a receptacle, an electrode comprising a metal-carbon-containing compound and a carbon binder, an opposite electrode, and an intervening body of heated electrolyte.

58. A cell comprising a combination of a receptacle, an electrode comprising a metal carbid and a carbon binder, an opposite electrode, and an intervening body of heated electrolyte.

59. A cell comprising a combination of a receptacle, an electrode comprising an acetylid and a carbon binder, an opposite electrode, and an intervening body of heated electrolyte.

60. A cell comprising a combination of a receptacle, an electrode comprising a metal acetylid and a carbon binder, an opposite electrode, and a heated electrolyte.

61. A cell comprising a combination of a receptacle, an electrode comprising a carbid and a carbon binder, an opposite electrode, and an intervening body of molten electrolyte.

62. A cell comprising a combination of a receptacle, an electrode comprising a metal-carbon-containing compound and a carbon binder, an opposite electrode, and an intervening body of molten electrolyte.

63. A cell comprising a combination of a receptacle, an electrode comprising a metal carbid and a carbon binder, an opposite electrode, and an intervening body of molten electrolyte.

64. A cell comprising a combination of a receptacle, an electrode comprising an acetylid and a carbon binder, an opposite electrode, and an intervening body of molten electrolyte.

65. A cell comprising a combination of a receptacle, an electrode comprising a metal acetylid and a carbon binder, an opposite electrode, and an intervening body of molten electrolyte.

66. A cell comprising a combination of a receptacle, an anode comprising a carbid and a binder, a cathode, and an intervening body of electrolyte.

67. A cell comprising a combination of a receptacle, an anode comprising a carbid and a carbon binder, a cathode, and an intervening body of electrolyte.

68. A cell comprising a combination of a receptacle, an anode comprising a metal-carbon-containing compound and a binder, a cathode, and an intervening body of electrolyte.

69. A cell comprising a combination of a receptacle, an anode comprising a metal-carbon-containing compound and a carbon binder, a cathode, and an intervening body of electrolyte.

70. A cell comprising a combination of a receptacle, an anode comprising a metal carbid and a binder, a cathode, and an intervening body of electrolyte.

71. A cell comprising a combination of a receptacle, an anode comprising a metal carbid and a carbon binder, a cathode, and an intervening body of electrolyte.

72. A cell comprising a combination of a receptacle, an anode comprising an acetylid and a binder, a cathode, and an intervening body of electrolyte.

73. A cell comprising a combination of a receptacle, an anode comprising an acetylid and a carbon binder, a cathode, and an intervening body of electrolyte.

74. A cell comprising a combination of a receptacle, an anode comprising a metal acetylid and a binder, a cathode, and an intervening body of electrolyte.

75. A cell comprising a combination of a receptacle, an anode comprising a metal acetylid and a carbon binder, a cathode, and an intervening body of electrolyte.

76. A cell comprising a combination of a receptacle, an anode comprising a carbid and a binder, a cathode, and an intervening body of fluid electrolyte.

77. A cell comprising a combination of a receptacle, an anode comprising a carbid and a carbon binder, a cathode, and an intervening body of fluid electrolyte.

78. A cell comprising a combination of a receptacle, an anode comprising a metal-carbon-containing compound and a binder, a cathode, and an intervening body of fluid electrolyte.

79. A cell comprising a combination of a receptacle, an anode comprising a metal-carbon-containing compound and a carbon binder, a cathode, and an intervening body of fluid electrolyte.

80. A cell comprising a combination of a receptacle, an anode comprising a metal carbid and a binder, a cathode, and an intervening body of fluid electrolyte.

81. A cell comprising a combination of a receptacle, an anode comprising a metal carbid and a carbon binder, a cathode, and an intervening body of fluid electrolyte.

82. A cell comprising a combination of a receptacle, an anode comprising an acetylid and a binder, a cathode, and an intervening body of fluid electrolyte.

83. A cell comprising a combination of a receptacle, an anode comprising an acetylid and a carbon binder, a cathode, and an intervening body of fluid electrolyte.

84. A cell comprising a combination of a receptacle, an anode comprising a metal acetylid and a binder, a cathode, and an intervening body of fluid electrolyte.

85. A cell comprising a combination of a receptacle, an anode comprising a metal acetylid and a carbon binder, a cathode, and an intervening body of fluid electrolyte.

86. A cell comprising a combination of a receptacle, an anode comprising a carbid and a binder, a cathode, and an intervening body of liquefied electrolyte.

87. A cell comprising a combination of a receptacle, an anode comprising a carbid and a carbon binder, a cathode, and an intervening body of liquefied electrolyte.

88. A cell comprising a combination of a receptacle, an anode comprising a metal-carbon-containing compound and a binder, a cathode, and an intervening body of liquefied electrolyte.

89. A cell comprising a combination of a receptacle, an anode comprising a metal-carbon-containing compound and a carbon binder, a cathode, and an intervening body of liquefied electrolyte.

90. A cell comprising a combination of a receptacle, an anode comprising a metal carbid and a binder, a cathode, and an intervening body of liquefied electrolyte.

91. A cell comprising a combination of a receptacle, an anode comprising a metal carbid and a carbon binder, a cathode, and an intervening body of liquefied electrolyte.

92. A cell comprising a combination of a receptacle, an anode comprising an acetylid and a binder, a cathode, and an intervening body of liquefied electrolyte.

93. A cell comprising a combination of a receptacle, an anode comprising an acetylid and a carbon binder, a cathode, and an intervening body of liquefied electrolyte.

94. A cell comprising a combination of a receptacle, an anode comprising a metal acetylid and a binder, a cathode, and an intervening body of liquefied electrolyte.

95. A cell comprising a combination of a receptacle, an anode comprising a metal acetylid and a carbon binder, a cathode, and an intervening body of liquefied electrolyte.

96. A cell comprising a combination of a receptacle, an anode comprising a carbid and a binder, a cathode, and an intervening body of heated electrolyte.

97. A cell comprising a combination of a receptacle, an anode comprising a carbid and a carbon binder, a cathode, and an intervening body of heated electrolyte.

98. A cell comprising a combination of a receptacle, an anode comprising a metal-carbon-containing compound and a binder, a cathode, and an intervening body of heated electrolyte.

99. A cell comprising a combination of a receptacle, an anode comprising a metal-carbon-containing compound and a carbon binder, a cathode, and an intervening body of heated electrolyte.

100. A cell comprising a combination of a receptacle, an anode comprising a metal carbid and a binder, a cathode, and an intervening body of heated electrolyte.

101. A cell comprising a combination of a receptacle, an anode comprising a metal carbid and a carbon binder, a cathode, and an intervening body of heated electrolyte.

102. A cell comprising a combination of a receptacle, an anode comprising an acetylid and a binder, a cathode, and an intervening body of heated electrolyte.

103. A cell comprising a combination of a receptacle, an anode comprising an acetylid and a carbon binder, a cathode and an intervening body of heated electrolyte.

104. A cell comprising a combination of a receptacle, an anode comprising a metal acetylid and a binder, a cathode, and an intervening body of heated electrolyte.

105. A cell comprising a combination of a receptacle, an anode comprising a metal acetylid and a carbon binder, a cathode, and an intervening body of heated electrolyte.

106. A cell comprising a combination of a receptacle, an anode comprising a carbid and a binder, a cathode, and an intervening body of molten electrolyte.

107. A cell comprising a combination of a receptacle, an anode comprising a carbid and a carbon binder, a cathode, and an intervening body of molten electrolyte.

108. A cell comprising a combination of a receptacle, an anode comprising a metal-carbon-containing compound and a binder, a cathode, and an intervening body of molten electrolyte.

109. A cell comprising a combination of a receptacle, an anode comprising a metal-carbon-containing compound and a carbon binder, a cathode, and an intervening body of molten electrolyte.

110. A cell comprising a combination of a receptacle, an anode comprising a metal carbid and a binder, a cathode, and an intervening body of molten electrolyte.

111. A cell comprising a combination of a receptacle, an anode comprising a metal carbid and a carbon binder, a cathode, and an intervening body of molten electrolyte.

112. A cell comprising a combination of a receptacle, an anode comprising an acetylid and a binder, a cathode, and an intervening body of molten electrolyte.

113. A cell comprising a combination of a receptacle, an anode comprising an acetylid and a carbon binder, a cathode, and an intervening body of molten electrolyte.

114. A cell comprising a combination of a receptacle, an anode comprising a metal acetylid and a binder, a cathode, and an intervening body of molten electrolyte.

115. A cell comprising a combination of a receptacle, an anode comprising a metal acetylid and a carbon binder, a cathode, and an intervening body of molten electrolyte.

116. In an electrolytic cell, an electrode, comprising a carbid and a binder, as set forth.

117. In an electrolytic cell, an electrode, comprising a carbid and a carbon binder, as set forth.

118. In an electrolytic cell, an electrode, comprising a metal-carbon-containing compound and a binder, as set forth.

119. In an electrolytic cell, an electrode, comprising a metal-carbon-containing compound and a carbon binder, as set forth.

120. In an electrolytic cell, an electrode, comprising a metal carbid and a binder, as set forth.

121. In an electrolytic cell, an electrode, comprising a metal carbid and a carbon binder, as set forth.

122. In an electrolytic cell, an electrode, comprising an acetylid and a binder, as set forth.

123. In an electrolytic cell, an electrode, comprising an acetylid and a carbon binder, as set forth.

124. In an electrolytic cell, an electrode, comprising a metal acetylid and a binder, as set forth.

125. In an electrolytic cell, an electrode, comprising a metal acetylid and a carbon binder, as set forth.

126. In an electrolytic cell, an electrode, comprising calcium carbid and a binder, as set forth.

127. In an electrolytic cell, an electrode, comprising calcium carbid and a carbon binder, as set forth.

128. A cell comprising the combination of a receptacle, an electrode comprising calcium carbid and a binder, an opposite electrode, and a body of electrolyte.

129. A cell comprising the combination of a receptacle, an electrode comprising calcium carbid and a binder, an opposite electrode, and a body of fluid electrolyte.

130. A cell comprising a combination of a receptacle, an electrode comprising calcium carbid and a binder, an opposite electrode, and a body of liquefied electrolyte.

131. A cell comprising a combination of a receptacle, an electrode comprising calcium carbid and a binder, an opposite electrode, a body of liquefied electrolyte, and means for maintaining the electrolyte in a fluid condition.

132. A cell comprising a combination of a receptacle, an electrode comprising calcium carbid and a binder, an opposite electrode, and a body of heated electrolyte.

133. A cell comprising a combination of a receptacle, an electrode comprising calcium carbid and a binder, an opposite electrode, a body of heated electrolyte, and means for maintaining the electrolyte in a heated condition.

134. A cell comprising a combination of a receptacle, an electrode comprising calcium carbid and a binder, an opposite electrode, and a body of molten electrolyte.

135. A cell comprising a combination of a receptacle, an electrode comprising calcium carbid and a binder, an opposite electrode and a body of molten electrolyte, and means for maintaining the electrolyte in a molten condition.

136. A cell comprising a combination of a receptacle, an electrode comprising calcium carbid and a carbon binder, an opposite electrode and an intervening body of electrolyte.

137. A cell comprising a combination of a receptacle, an electrode comprising calcium carbid and a carbon binder, an opposite electrode, and an intervening body of fluid electrolyte.

138. A cell comprising a combination of a receptacle, an electrode comprising calcium carbid and a carbon binder, an opposite electrode, and an intervening body of liquefied electrolyte.

139. A cell comprising a combination of a receptacle, an electrode comprising calcium carbid and a carbon binder, an opposite electrode, and an intervening body of heated electrolyte.

140. A cell comprising a combination of a receptacle, an electrode comprising calcium carbid and a carbon binder, an opposite electrode, and an intervening body of molten electrolyte.

141. A cell comprising a combination of a receptacle, an anode comprising calcium carbid and a binder, a cathode, and an intervening body of electrolyte.

142. A cell comprising a combination of a receptacle, an anode comprising calcium carbid and a carbon binder, a cathode, and an intervening body of electrolyte.

143. A cell comprising a combination of a receptacle, an anode comprising calcium carbid and a binder, a cathode, and an intervening body of fluid electrolyte.

144. A cell comprising a combination of a receptacle, an anode comprising calcium carbid and a carbon binder, a cathode, and an intervening body of fluid electrolyte.

145. A cell comprising a combination of a receptacle, an anode comprising calcium carbid and a binder, a cathode, and an intervening body of liquefied electrolyte.

146. A cell comprising a combination of a receptacle, an anode comprising calcium carbid and a carbon binder, a cathode, and an intervening body of liquefied electrolyte.

147. A cell comprising a combination of a receptacle, an anode comprising calcium carbid and a binder, a cathode, and an intervening body of heated electrolyte.

148. A cell comprising a combination of a receptacle, an anode comprising calcium carbid and a carbon binder, a cathode, and an intervening body of heated electrolyte.

149. A cell comprising a combination of a receptacle, an anode comprising calcium carbid and a binder, a cathode, and an intervening body of molten electrolyte.

150. A cell comprising a combination of a receptacle, an anode comprising calcium carbid and a carbon binder, a cathode, and an intervening body of molten electrolyte.

In testimony whereof I affix my signature in presence of two witnesses.

HENRY SPENCER BLACKMORE.

Witnesses:
J. R. NOTTINGHAM,
CHARLES S. FLETCHER.